US012591932B1

(12) United States Patent
White et al.

(10) Patent No.: US 12,591,932 B1
(45) Date of Patent: Mar. 31, 2026

(54) METHOD AND SYSTEM OF AUTOMATEDLY GENERATING INSURANCE COVERAGE RECOMMENDATIONS USING PREDICTED WEATHER

(71) Applicant: UIPCO, LLC, San Antonio, TX (US)

(72) Inventors: Allison White, Bulverde, TX (US); Donnette L. Moncrief Brown, San Antonio, TX (US); Eric David Schroeder, San Antonio, TX (US); Justin Dax Haslam, San Antonio, TX (US); Manfred Amann, San Antonio, TX (US); Michael J. Maciolek, Kerrville, TX (US); William Dubyak, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 309 days.

(21) Appl. No.: 17/752,426

(22) Filed: May 24, 2022

(51) Int. Cl.
| | |
|---|---|
| *G06Q 40/08* | (2012.01) |
| *G01W 1/10* | (2006.01) |

(Continued)

(52) U.S. Cl.
CPC .............. *G06Q 40/08* (2013.01); *G01W 1/10* (2013.01); *G06F 40/40* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2012/0084248 A1* | 4/2012 | Gavrilescu | .......... G06F 16/9535 |
| | | | 706/54 |
| 2012/0323928 A1 | 12/2012 | Bhatia | |

(Continued)

FOREIGN PATENT DOCUMENTS

| | | |
|---|---|---|
| WO | 2024057301 A1 | 3/2024 |

OTHER PUBLICATIONS

Abbas et al., "A cloud based health insurance plan recommendation system: A user, centered approach," 2014, Future Generation Computer Systems 43-44 (2015) 9-109 (Year: 2014).

(Continued)

*Primary Examiner* — Divesh Patel
(74) *Attorney, Agent, or Firm* — Dannon G. Allbee; Potomac Law Group, PLLC

(57) ABSTRACT

Methods and systems described herein are directed to automatedly generating one or more insurance coverage recommendations. An insurance coverage recommendation system can retrieve data for a planned activity of the user, including a description for the planned activity and its location and duration. The system can then predict weather for the planned activity. Using the description for the activity, the location, the duration, and the predicted weather, the system can generate a user activity profile. The profile can be analyzed with a machine learning model, trained based on past insurance claims, to generate one or more needed insurance coverage levels for the planned activity. The needed insurance coverage levels can be mapped to one or more respective insurance coverage recommendations for applicable insurance products.

20 Claims, 8 Drawing Sheets

(51) Int. Cl.
  *G06F 40/40*    (2020.01)
  *G06N 20/00*    (2019.01)

(56)            References Cited

U.S. PATENT DOCUMENTS

| | | | |
|---|---|---|---|
| 2015/0248721 | A1 | 9/2015 | Brown |
| 2015/0262208 | A1 | 9/2015 | Bjontegard |
| 2015/0302522 | A1* | 10/2015 | Howe .................... G06Q 40/04 |
| | | | 705/4 |
| 2017/0154337 | A1 | 6/2017 | Wingate-Whyte et al. |
| 2018/0218303 | A1* | 8/2018 | Cole ...................... G06N 20/00 |
| 2018/0349489 | A1* | 12/2018 | Toudji ................... G06F 16/313 |
| 2019/0391827 | A1 | 12/2019 | Simanovich et al. |
| 2020/0137438 | A1 | 4/2020 | Whitman et al. |
| 2020/0342550 | A1 | 10/2020 | Halimsaputera |
| 2020/0411159 | A1* | 12/2020 | Chien ..................... G06F 3/011 |
| 2021/0027357 | A1 | 1/2021 | Bonfigli et al. |
| 2021/0133782 | A1 | 5/2021 | Mahajan et al. |
| 2021/0248696 | A1 | 8/2021 | Reis et al. |
| 2021/0264479 | A1 | 8/2021 | Reis et al. |
| 2022/0172309 | A1 | 6/2022 | Corona Pompa et al. |
| 2022/0327642 | A1 | 10/2022 | Kabir et al. |
| 2022/0351300 | A1 | 11/2022 | Sakumoto et al. |
| 2023/0185813 | A1 | 6/2023 | Xu et al. |
| 2023/0194753 | A1* | 6/2023 | Borges Oliveira .... G06N 3/047 |
| | | | 702/3 |
| 2023/0377050 | A1* | 11/2023 | Umeda .................. G06Q 40/08 |
| 2025/0166100 | A1 | 5/2025 | Likholyot et al. |

OTHER PUBLICATIONS

Jain et al, Real Estate Market in the Digital Age: A Review of Technology Trends and Advancements, 2023 6th International Conference on Recent Trends in Advance Computing (ICRTAC), pp. 790-795 (Year: 2023).

Parameswaran et al, Accommodation Finder: An Augmented Reality Based Mobile Application Integrated with Smart Contracts, 2021 3rd Int'l Conference on Advancements in Computing (ICAC), pp. 341-346 (Year: 2021).

Singh et al, Transforming E-Commerce: Augmented Reality (AR) and Virtual Reality (VR) Integration for Interactive and Immersive Shopping Experiences, 2023 7th International Conference on Electronics, Materials Engineering & Nano-Technology (IEMENTech), pp. 1-5 (Year: 2023).

* cited by examiner

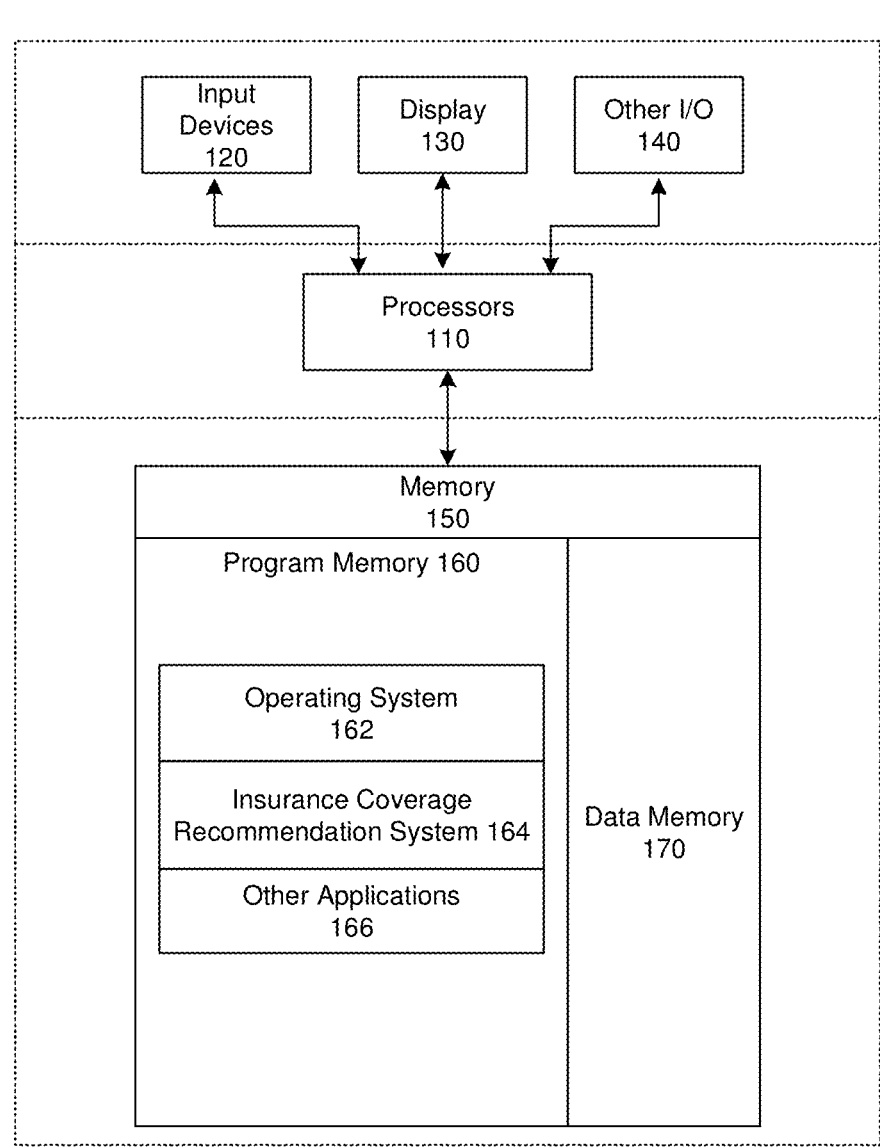
*FIG. 1*

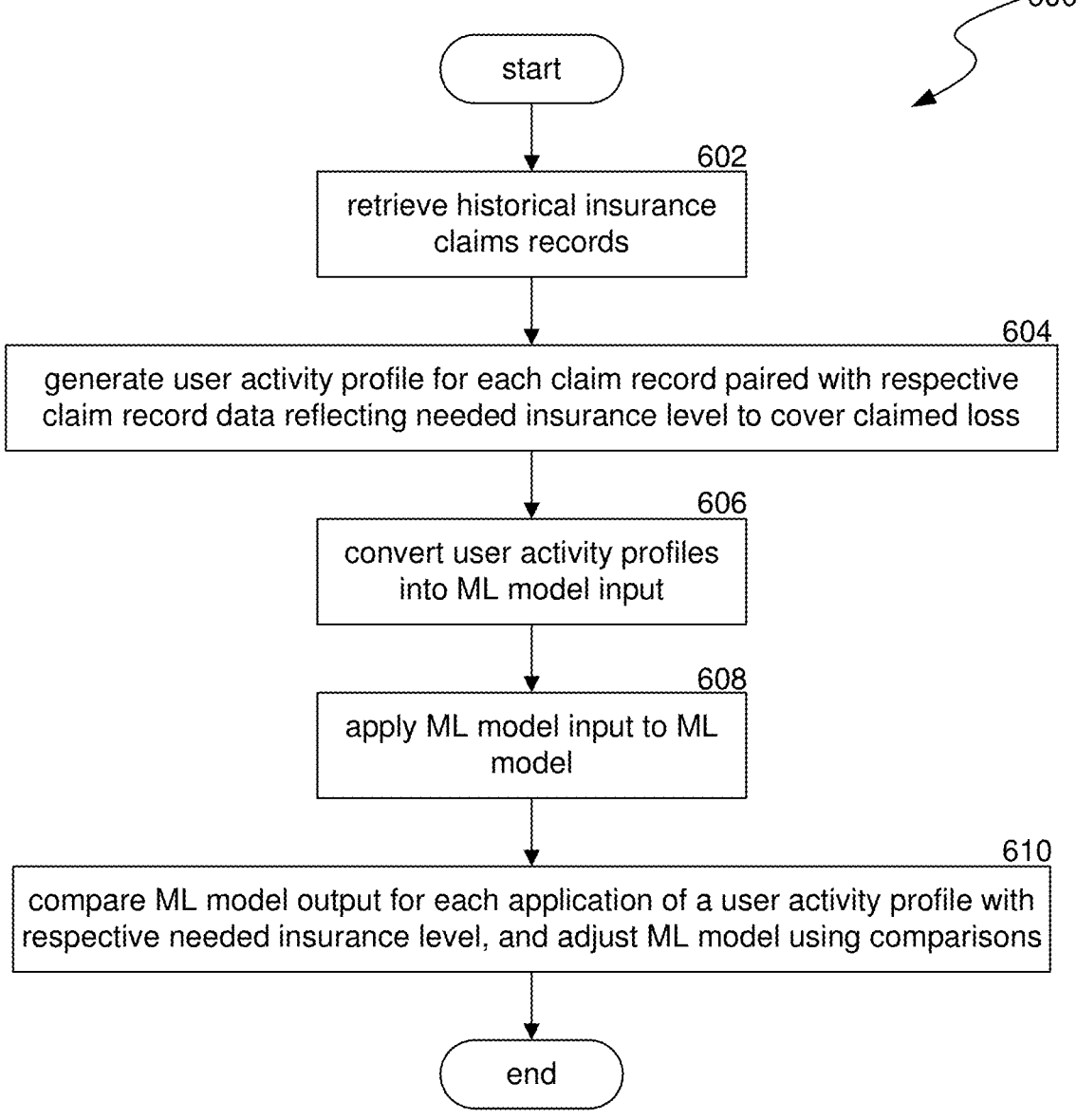

600 start 602
retrieve historical insurance claims records 604
generate user activity profile for each claim record paired with respective claim record data reflecting needed insurance level to cover claimed loss 606
convert user activity profiles into ML model input 608
apply ML model input to ML model 610
compare ML model output for each application of a user activity profile with respective needed insurance level, and adjust ML model using comparisons end

*FIG. 6*

METHOD AND SYSTEM OF AUTOMATEDLY GENERATING INSURANCE COVERAGE RECOMMENDATIONS USING PREDICTED WEATHER

RELATED APPLICATIONS

This application is related to U.S. patent application Ser. No. 17/752,441, titled "Automated, Hyper-Personalized Recommendation Platform," filed May 24, 2022, which is herein incorporated by reference in its entirety.

TECHNICAL FIELD

The present disclosure is directed to automatedly determining relocation activities and generating one or more insurance coverage recommendations for an individual when considering an associated activity profile including predicted weather for the activity.

BACKGROUND

People constantly relocate, whether for work or leisure, to a new geographical area for various amounts of time. Whether for a short vacation or a long-term work deployment, in many cases, the relocating people are unaware of risks associated with their destination for the time period of their visit. Thus, it can be difficult to know an appropriate amount of insurance coverage to adequately manage an overall risk associated with the relocation. A primary reason for the uncertainty can be the weather conditions for the new area, especially if it is entirely unfamiliar to an individual. For example, insurance claims associated with such relocation events are often denied or a coverage amount is insufficient to adequately mitigate a harm incurred. However, people often forget to check or are unaware of the need for acquiring additional insurance and/or adjusting coverage amounts.

BRIEF DESCRIPTION OF THE DRAWINGS

FIG. 1 is a block diagram illustrating an overview of devices on which some implementations can operate.

FIG. 6 is a flow diagram illustrating a process used in some implementations for training a machine learning model to determine one or more needed levels of insurance coverage for the user activity profile.

The techniques introduced here may be better understood by referring to the following Detailed Description in conjunction with the accompanying drawings, in which like reference numerals indicate identical or functionally similar elements.

DETAILED DESCRIPTION

Figure 2:
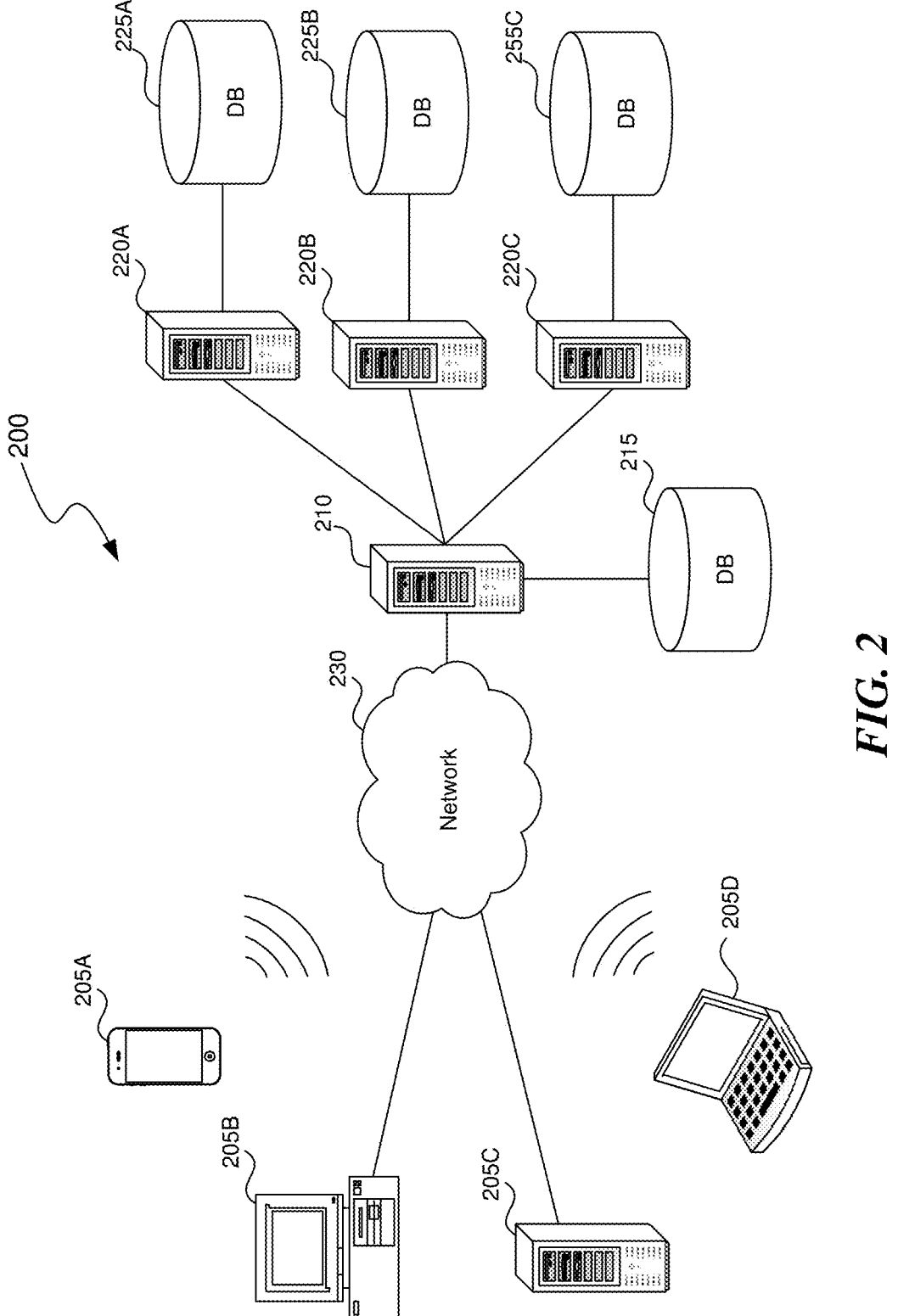
FIG. 2 is a block diagram illustrating an overview of an environment in which some implementations can operate.

Aspects of the present disclosure are directed to automatedly generating one or more insurance coverage recommendations for an individual when considering an associated activity profile. An insurance coverage recommendation system can collect information (or data) for determining a user activity (such as travel or a relocation) and populating the user activity profile of the user. The user activity profile can provide the system with details describing the predicted weather for a planned activity of the user when considering a location and/or a duration for the planned activity. The user activity profile can further provide the insurance coverage recommendation system with details describing a type of user risk for the planned activity, as derived from prior behavior of the user. The insurance coverage recommendation system can then apply the user activity profile to a machine learning model to obtain one or more needed insurance coverage levels corresponding to the user activity profile. Using the obtained one or more insurance coverage levels, the insurance coverage recommendation system can provide to the user one or more insurance coverage recommendations for respective insurance products.

The insurance coverage recommendation system can collect data for the location and/or the duration of the planned activity from a myriad of information sources. In some cases, the user can personally provide data for the planned activity, whether through an oral and/or written submission for the data. In some cases, the insurance coverage recommendation system can, upon the user providing prior permission for collection, collect data automatically for indications of the planned activity. For example, the permission can enable the insurance coverage recommendation system to collect activity data using entries made by the user at a communications and/or a computing device, such as a search query history, a messaging history, a document and/or website viewing history, a purchase history, etc.

The insurance coverage recommendation system can determine the predicted weather for the planned activity by executing a predetermined algorithm configured to assess current and past weather for the location at, for example, a given time interval, such as a time of year, for the duration of the planned activity. Alternatively or in addition, the insurance recommendation system can determine the predicted weather for the location and duration of the planned activity using data aggregated from one or more weather reporting services, such a media outlets and other dedicated providers of weather analysis, e.g., weather services. Using the assessment, the algorithm can provide a weather prediction (based on either or both of a history of weather and/or meteorological predictions) for the location of the planned activity during the determined duration for the planned activity.

The insurance coverage recommendation system can generate a user activity profile populated by a description of the planned activity, including location, the predicted weather and, optionally, the user risk level for the planned activity of the user. In some implementations, the user activity profile can be further populated with the duration for the planned activity of the user. The insurance coverage recommendation system can convert the user activity profile into input which can be fed to a machine learning model. The machine learning model can be trained to generate, as output, one or more needed insurance coverage levels, i.e., amounts for various risk categories, which can be adequate to manage the risk for the user activity profile. Training data for training the machine learning model can be derived from user activity profiles for previously filed insurance claims paired with their needed insurance coverage levels, i.e., amounts of coverage fully covering claimed losses. For example, each of the user activity profiles can describe a given weather event and what amount of coverage would have been needed to fully cover the claim involving that event. Once trained, the machine learning model can provide the insurance coverage recommendation system with the one or more needed insurance coverage levels for new instances of user activity profiles. The insurance coverage recommendation system can then use the provided coverage levels to formulate one or more respective insurance coverage recommendations for the provided coverage levels.

In some implementations, the insurance coverage recommendation system can determine the one or more insurance coverage recommendations for the respective one or more needed insurance coverage levels by using a predetermined mapping of insurance coverage levels to one or more suitable insurance products.

Following obtaining the needed insurance coverage levels and the recommended insurance product(s) for the user activity profile of the user, the insurance coverage recommendation system can automatically notify the user via, for example, a mobile device app, web interface, text message, or other electronic communication, of the one or more recommendations.

Existing manners of assessing selections for adequate insurance coverage to manage potential risk have relied upon the separate analyses of many factors. To carry out the analyses, it is often the case that it is necessary to invoke a multitude of computing resources each of which separately analyzes one or more of those factors without regard to a specific, planned activity. For example, the selection of life or property insurance products is ordinarily carried out with regard to a user's determination of a specific, long-term goal or expectancy, without accounting for whether these determinations align with historical events or predicted factors such as travel and weather events. The insurance coverage recommendation system and methods disclosed herein are expected to overcome these deficiencies in existing systems by collecting user data to determine a specific planned activity, generate a user profile according to the collected data, and determine an insurance coverage recommendation for that specific, planned activity by applying a machine learning model trained using determinations of previous insurance needs for similar activities. This uses coordination between multiple disassociated computing systems (e.g., integrations with weather monitoring and prediction providers, systems for obtaining machine learning training data and creating models, and user devices) to newly provide the insurance coverage recommendation. The ability to provide such recommendations in real-time provides a new way for a user to manage risk that may be associated with the planned activity. That is, the user need not be required to engage in a laborious assessment of insurance products that might be applicable to the planned activity. Such manual assessments can be avoided by the herein described application of a machine learning model on the user activity profile converted as input for the model. Through that conversion, problems associated with data aggregation otherwise existing among current systems can be solved. Further, because the model can be trained to assess the converted user activity profile for a corresponding needed insurance coverage level, an associated insurance coverage recommendation can be provided to a user with ease and expediency. This is especially the case when considering that the converted user activity profile accounts for conditions, such as the weather, which can be entirely unknown to the user when arranging for the planned activity. Accordingly, implementations of the present technology as are described herein permit the user to obtain an insurance coverage recommendation for a specific, planned activity in manners unlike existing systems.

Several implementations are discussed below in more detail in reference to the figures. FIG. 1 is a block diagram illustrating an overview of devices on which some implementations of the disclosed technology can operate. The devices can comprise hardware components of a device 100 that automatedly generates and issues one or more insurance coverage recommendations for a user activity profile of a user. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an insurance coverage recommendation system 164, and other application programs 166. Memory 150 can also include data memory 170, e.g., user input data of a computing and/or communications device, user website browsing history data, user purchase history data, historical, current, and predicted weather data, historical insurance claims records data, match score data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as user input data of a computing and/or communications device, user website browsing history data, user purchase history data, historical, current, and predicted weather data, historical insurance claims records data, and match score data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
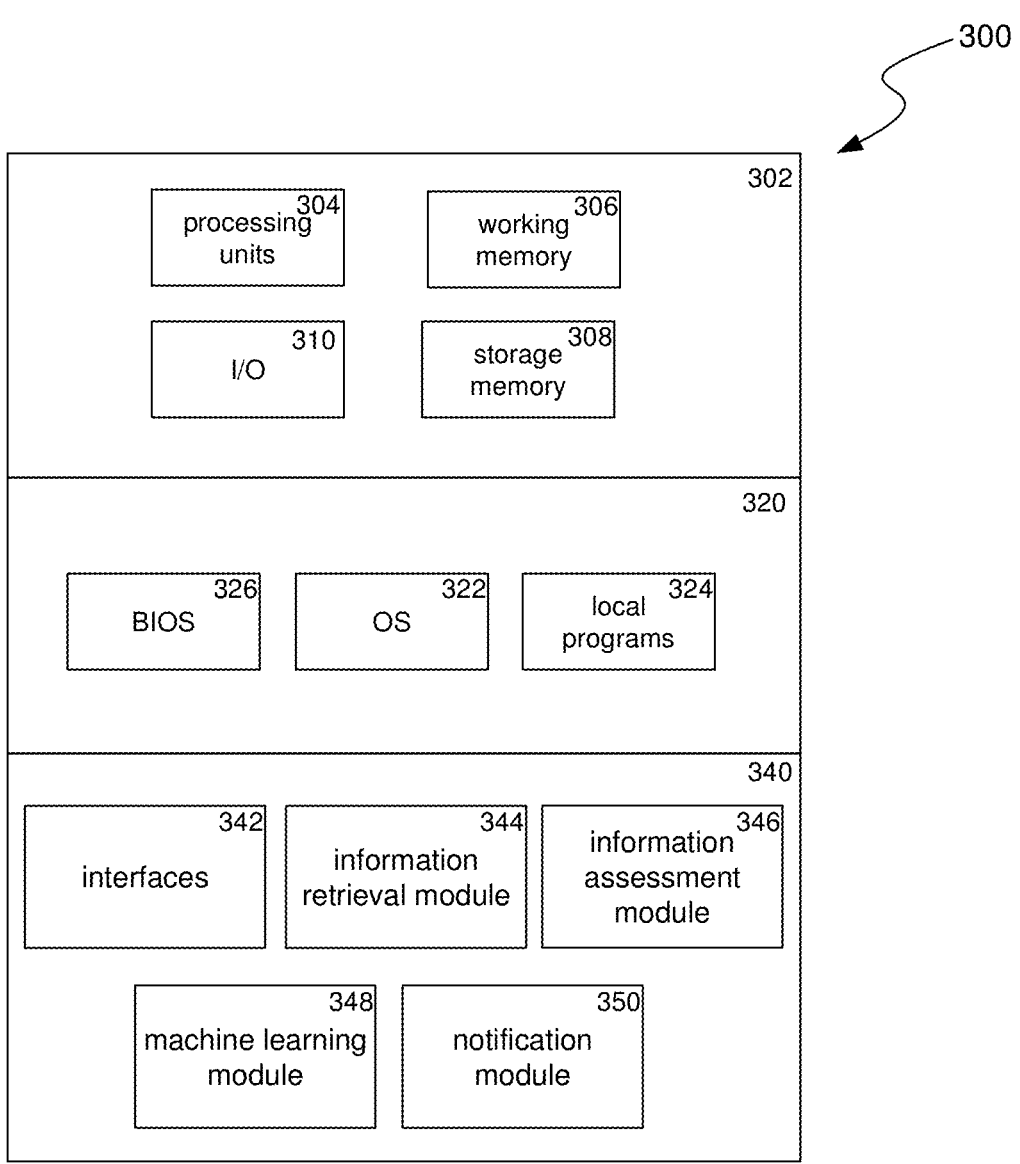
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include information retrieval module 344, information assessment module 346, machine learning module 348, notification module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can, with relevant permissions being provided by the user, retrieve data for a planned user activity according to any of entries made by the user at a communications and/or computing device, e.g., a search query history, a messaging history, a document and/or website viewing history, a purchase history, etc. For example, information retrieval module 344 can retrieve data that the user enters, either by keystroke or oral delivery, into a communications and/or communications device. As another example, information retrieval module 344 can retrieve a substance and viewing history of the user for certain stored and/or digitized documents. In some implementations, information retrieval module 344 can retrieve a history of websites that the user has visited, as well as activity by the user for those websites. As yet another example, information retrieval module 344 can retrieve one or more of data entry, banking and credit account data demonstrating a purchase history of the user. As a more specific example, the information retrieval module 344 can retrieve a purchase for an airline ticket indicating the user may be taking a trip, and may correlate this with website viewing data to determine trip dates and destinations. Additional details on retrieving data for a planned user activity are provided below in relation to block 402 of FIG. 4 and block 502 of FIG. 5.

In some implementations, information assessment module 346 can assess the data retrieved by information retrieval module 344 to determine whether the data evinces a user intent to relocate. For example, information assessment module 346 can invoke one more exemplary methods, such as natural language processing (NLP), to determine any user intent to relocate and any corresponding duration for the relocation. Alternatively or in addition, information assessment module 346 can determine a user's intent according to, for example, data entry and/or viewing history, either of a given document or of a website. For example, information assessment module 346 can determine that a user is intent on relocating to a given destination for a specific duration if retrieved data indicates a viewing history of, for instance, finalized travel documents setting forth the location and the duration for the planned activity. The information assessment module 346 can analyze this retrieved data to determine semantic meaning, such as by applying a machine learning model trained to recognize phrases, viewing history, etc., indicating travel, moving, deployment, and corresponding dates for such relocations. For example, multiple users may have manually indicated such relocations while also providing authorization to review their relocation data sources, and these data sources paired with their relocation plans can be used as training data for the machine learning model of the information assessment module 346. Additional details on assessing a user's intent for relocation to a new destination are provided below in relation to block 402 of FIG. 4 and block 502 of FIG. 5.

In some implementations, information assessment module 346 can also analyze historical and current weather conditions to predict relevant weather for a location and duration expressed by the user's intent. Alternatively or in addition, information assessment module 346 can determine predictions for the relevant weather according to its analysis of data derived from one or more dedicated weather service outlets. For example, information assessment module 346 can review the weather event history of a location for the past 30 years, for a given time period, to determine the likelihood of various events for which insurance may be relevant (e.g., hurricanes, flooding, fire, heavy snow, tornadoes, heavy fog, tropical storms, excessive lightning, etc.). When the user's expected relocation event is close enough in time, the information assessment module 346 can also or instead use meteorological predictions of such events for the given location and time frame. Additional details on predicting relevant weather for a user's planned activity are provided below in relation to block 404 of FIG. 4.

In some implementations, information assessment module 346 can further assess, using on one or more of the data retrieved by information retrieval module 344, a type of user risk for the planned activity, such as the user's penchant for driving while it's snowing, ignoring weather warnings, accessing warning data, etc. In some cases, this user risk assessment can be derived from certain prior observed behavior of the user (e.g., based on user location data, activity determinations, internet viewing history, purchase history, etc.) Alternatively or in addition, information assessment module 346 can assess the type of user risk according to historical insurance claims records of the user. In other words, the prior behavior of the user can indicate that the user has a tendency to act conservatively or non-conservatively in various situations. Thus, in view of one or more observed tendencies, information assessment module 346 can assign a type of the risk that can be, for example, low, medium, or high risk of carrying out behavior that can lead to injury or property damage, and thus the need to file an insurance claim. Additional details on assessing a type of user risk for a planned activity with respect to a given weather event are provided below in relation to block 406 of FIG. 4 and blocks 504 and 506 of FIG. 5.

In some implementations, information assessment module 346 can generate a user activity profile using each of a description of the planned activity, including location, the predicted weather and the user risk level for the planned activity of the user. Alternatively or in addition, information assessment module 346 can further include a duration for the planned activity in the user activity profile. Additional details on generation of the user activity profile are provided below in relation block 408 of FIG. 4 and block 508 of FIG. 5.

In some implementations, machine learning module 348 can convert the user activity profile into a machine learning model input. For example, values from the user activity profile can be entered into a vector that a machine learning model has been trained to receive. The machine learning model can be trained according to training user activity profiles derived from previously filed insurance claims paired with needed insurance coverage levels, where the levels indicate the types/amounts of insurance which were necessary to fully cover losses for each of the claims. Each profile can include the type of claim filed, the duration of policy coverage, the location for an incident for which the claim was filed, a description of user involvement in the incident, and/or the weather at the time of the incident. By applying each profile to the machine learning model, comparing the results from the machine learning model to the paired types/amounts of insurance which were necessary to fully cover losses, and updating the model parameters based on this comparison, the machine learning model can be trained to generate types/amounts of insurance necessary for a given profile. This way, the machine learning model can, once trained, determines one or more needed insurance coverage levels for new instances of user activity profiles which can exhibit same or similar weather related circumstances as those involved in the training data. The machine learning module 348 can then apply the model input to the trained machine learning model to obtain one or more needed insurance coverage levels for a respective new user activity profile. That is, the machine learning model is trained to obtain those amounts of insurance which are actually needed to fully cover losses which may occur according to a predicted weather event and type of risk of the user for such predicted weather event. For instance, that type of risk can be with respect to one or more predicted weather events of the user activity profile. Additional details on converting a user activity profile into machine learning model input and applying the input to a trained machine learning model are provided below in relation to blocks 410 and 412 of FIG. 4. Additional details on training the machine learning model are provided below in relation to FIG. 6.

In some implementations, notification module 350 can provide one or more insurance coverage recommendations respectively corresponding to the one or more needed insurance coverage levels. The recommendations can be formulated according to a predetermined mapping for insurance coverage levels to applicable insurance products. Thus, the recommendations can be applicable insurance products which provide the needed insurance coverage levels. In some implementations, notification module 350 can provide the one or more insurance coverage recommendations to the user in real-time, e.g., while the user is arranging aspects for the planned activity. In some implementations, notification module 350 can provide the one or more insurance coverage recommendations to the user via the same device from which information retrieval module 344 retrieved data indicating the planned activity. For example, the recommendations can be provided to the user via one or more notifications displayed on a mobile app, by a website, or in a text message or email, etc. Additional details on notifying a user of one or more insurance coverage recommendations are provided below in relation to blocks 414 and 416 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
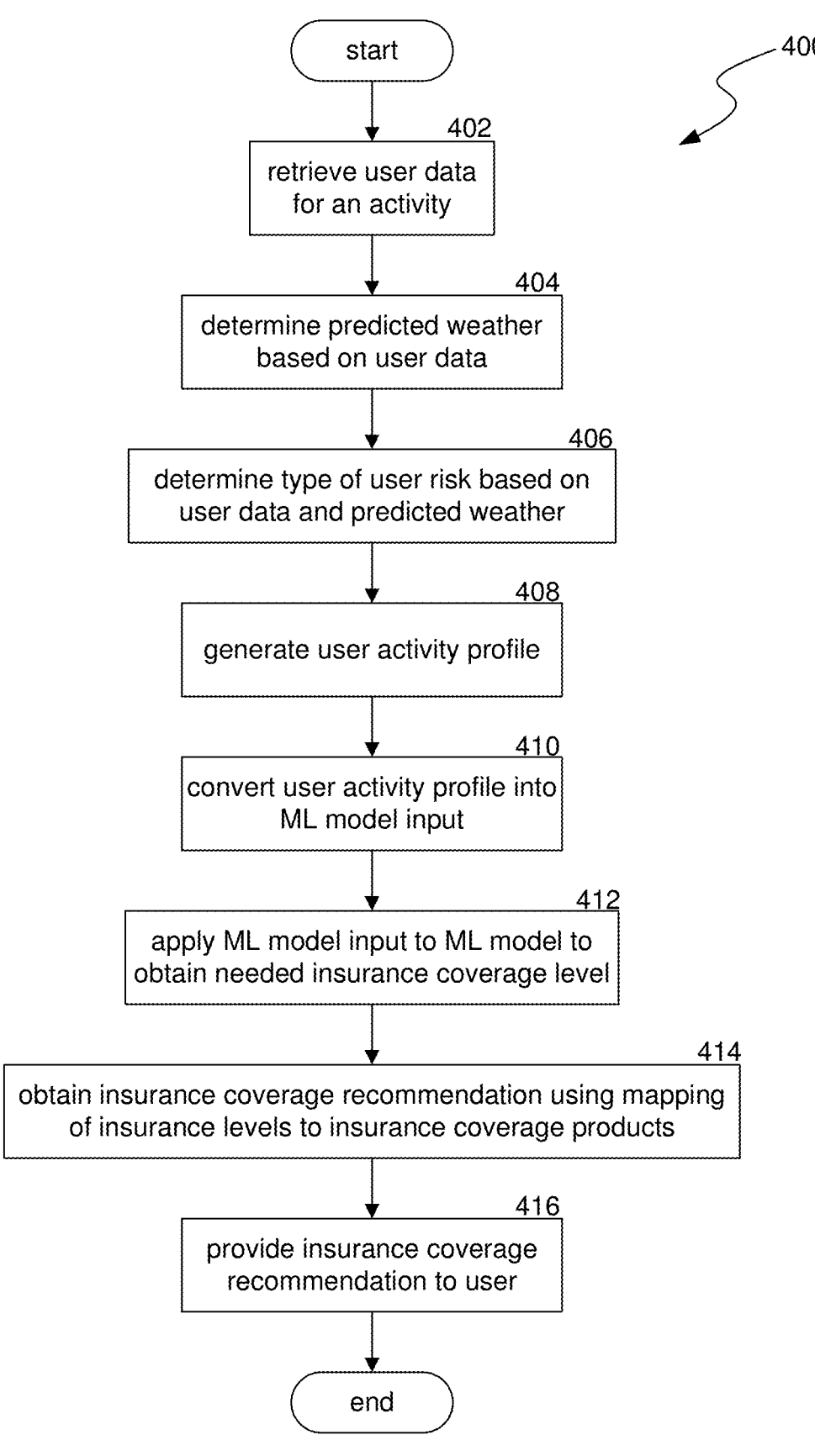
FIG. 4 is a flow diagram illustrating a process used in some implementations for generating and providing one or more insurance coverage recommendations for a user of an insurance coverage recommendation system.

FIG. 4 is a flow diagram illustrating a process 400 used in some implementations for generating and providing one or more insurance coverage recommendations for a user of the insurance coverage recommendation system 164 (hereinafter "recommendation system 164"). In some implementations, process 400 can be performed on a client device-such as a mobile device executing the recommendation system 164 as part of an app or on a personal computing device as client-side process of a website. In other cases, process 400 can be performed on a server system, e.g., a system serving recommendations via such an app or website. Process 400 can be initiated when a user signs up to receive insurance coverage recommendations. Process 400 can be performed whenever recommendation system 164 detects an intent of the user to relocate to a new geographical area. For example, recommendation system 164 can automatedly generate and provide an insurance coverage recommendation to the user in response to retrieved user data evincing, for example, a planned activity such as a military deployment, a vacation, a short or long term work-related transfer, etc. In other cases, process 400 can be performed in response to a user accessing an insurance recommendation interface and specifying a relocation event. In some implementations, recommendation system 164 can automatedly generate and provide the insurance coverage recommendation to the user in response to the planned activity lasting longer than a predetermined time period, e.g., one week.

At block 402, process 400 can retrieve user data for a planned activity. The data can include, for example, entries made by the user at a communications and/or computing device, e.g., a search query history, a messaging history, a document and/or website viewing history, a purchase history, a location history, an activity history, etc. In some implementations, the retrieved use data can be data the user has authorized to be retrieved and may have provided credentials or authentication information for this retrieval. When retrieving the user data for an activity, information retrieval module 344 and information assessment module 346 can operate in tandem to retrieve only data evincing a user intent to relocate. This way, an operational efficiency of the recommendation system 164 can be optimized to, for example, provide for storage of only data that can be useful in formulating one or more insurance coverage recommendations and to retrieve and store only the private data necessary to effectively generate recommendations. In some cases, the retrieved user data is an explicit provision from the user specifying a relocation timeframe and destination. For example, the specified relocation timeframe and destination can be determined by information assessment module 346 recognizing semantic meaning. Such meaning can be determined by the information assessment module 346 applying a machine learning model trained to recognize phrases, a viewing history for a document and/or website, etc., indicating travel from one location to another for a given duration.

At block 404, process 400 can use the retrieved and assessed user data to determine the predicted weather for the determined user's destination and timeframe for the planned activity. To do so, process 400 can execute an algorithm configured to assess current and past weather for the destination at, for example, a given time of year that is relevant to the location and duration of the planned activity. For example, if the user data indicates that the planned activity will occur in the month of March, the process 400 can execute the algorithm to generate a statistical model of weather patterns during that month over the course of a predetermined number of preceding years. Using the assessment, the algorithm can provide a weather prediction for the relocation destination and duration by averaging statistics for current and past weather conditions. Alternatively or in addition, the insurance recommendation system can determine the predicted weather for the planned activity by using data aggregated from one or more weather reporting services, such a media outlets and other dedicated providers of weather analysis. For example, data from the weather reporting services can be obtained when the timeframe for the planned activity is near enough to the current time for the weather reporting services to have made weather predictions (e.g., in a 10-day forecast).

At block 406, process 400 can determine a type of user risk for the planned activity. That is, process 400 can examine prior behavior of the user and determine whether the user has a tendency to act in a risk taking or risk averse manner in various situations. Thus, in view of one or more observed tendencies, process 400 can assign a type of the risk that can be, for example, low, medium, or high risk of carrying out behavior that can lead to injury or property damage or loss and thus the filing of an insurance claim. Additional details relating to the assignment of the type of user risk are provided below in relation to blocks 504 and 506 of FIG. 5.

At block 408, process 400 can generate a user activity profile for the planned user activity. In this regard, the user activity profile can compile each of a description of the planned activity, including location, the predicted weather, and the user risk level for the planned activity of the user. Alternatively or in addition, process 400 further include a duration for the planned activity in the user activity profile, such as where the duration for the planned activity meets or is less than a predetermined threshold, e.g., about a month (wherein it is contemplated that the term "about" can mean 29-32 days).

At block 410, process 400 can convert the user activity profile into input for a machine learning model. For example, data items from the user activity profile can be entered in a sparse vector where the vector slots of the sparse vector can correspond to the particular data items of the user activity profile. Each of the data items can be paired with a predetermined and corresponding degree of severity for the particular data item using a scale of, for instance, 0 to 100, where 100 represents the highest severity. For example, the value in the sparse vector corresponding to predicted weather can be assigned a degree of severity of 85 if the prediction is for a major hurricane. In contrast, the degree of severity may only be 15 if the prediction is for a minor rain event. As another example, the value in the sparse vector corresponding to the duration for the user planned activity can be a number of days. As still another example, the value in the sparse vector corresponding to type of user risk can be assigned a degree of severity of 100 if the determined type of user risk is high. When the type of user risk is determined to be low or medium, the assigned degree of severity can be 33 for low risk and 66 for medium risk.

At block 412, process 400 can apply the machine learning model input to a machine learning model (trained as discussed in relation to FIG. 6) to obtain one or more needed insurance coverage levels for the converted user activity profile. For instance, the machine learning model can produce, for given types of expected damage resulting from predicted weather, e.g., personal injury and/or property damage due to covered causes, corresponding needed coverage amounts for mitigating the expected damage. As an example, if predicted weather comprises wind conditions which can lead to roof damage of a dwelling, then the machine learning model can produce a needed coverage amount to repair or replace the roof of the dwelling. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. A new data item can have parameters that a model can use to assign a classification to the new data item. As another example, a model can be a probability distribution resulting from the analysis of training data, such as a likelihood of an input matching a conclusion, a given a particular input, based on an analysis of a large corpus of inputs with corresponding correct conclusions. Examples of models include: neural networks (traditional, deep, convolution, recurrent (RNN)), support vector machines, decision trees, decision tree forests, Parzen windows, Bayes, clustering, reinforcement learning, probability distributions, and others. Models can be configured for various situations, data types, sources, and output formats. Here, the machine learning model can be trained to predict a needed level of insurance coverage for the converted user activity profile. Additional details on the training of the machine learning model are provided below in relation to FIG. 6.

At block 414, process 400 can obtain one or more respective insurance coverage recommendations for the needed insurance coverage levels obtained from the machine learning model. Process 400 can obtain the insurance coverage recommendation using a predetermined mapping of insurance levels to insurance coverage products. That is, the mapping can indicate an appropriate insurance coverage product, whether a type of life, property, umbrella, etc. insurance with a corresponding coverage amount, which can provide adequate insurance coverage for an insurance level predicted by the machine learning model at block 412. In this regard, it is contemplated that the mapping can also include coverage options for vehicle, health, pet, travel, personal property, umbrella, small business, or any other type of insurance that could be applicable to the needed insurance level for the user activity profile. For example, one or more of the above insurance coverage products can be a microinsurance product providing coverage for the limited duration of the user's relocation as is determined by process 400.

At block 416, process 400 can provide the insurance coverage recommendation to the user via, for example, one or both of computing devices 205A and device 205D. In some implementations, process 400 can also provide additional trip data, such as expected weather/weather events for the trip, travel advisories, news for the trip location, etc. Process 400 can provide the insurance coverage recommendation to the user in real time, e.g., during one or more planning stages involving either of the above devices. For instance, process 400 can provide, via one or more of such devices, the insurance coverage recommendation in the form of a notification displayed on a mobile app, by a website, in a text message or email, etc. Once received, the user can use the notification containing an offer of coverage to view product details and purchase the product. If an existing policy is already in place, the user can review the notification to, e.g., update current coverage levels prior to the user undertaking a relocation. Additional details on providing the insurance coverage recommendation are described below with reference to FIG. 7B and its accompanying description.

Figure 5:
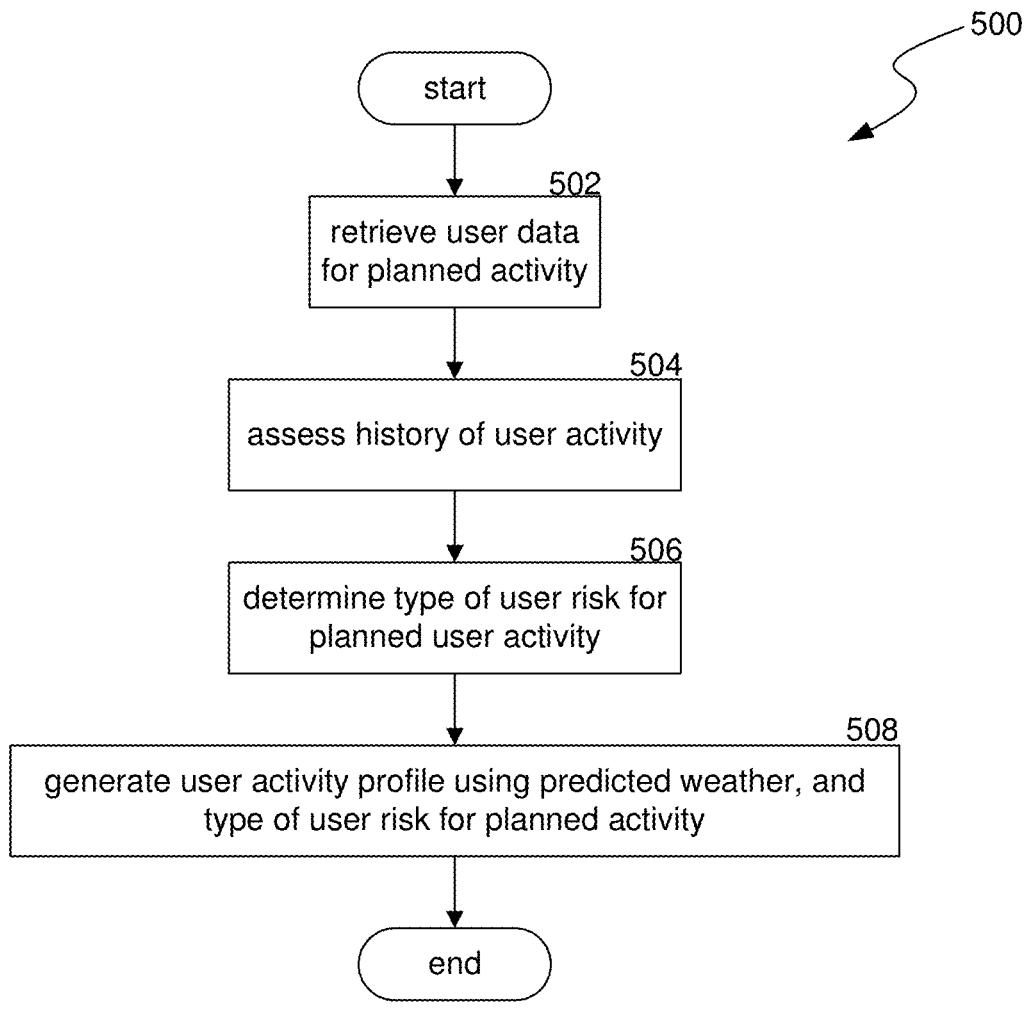
FIG. 5 is a flow diagram illustrating a process used in some implementations for generating a user activity profile for the user of the insurance coverage recommendation system.

FIG. 5 is a flow diagram illustrating a process 500 used in some implementations for generating a user activity profile for the user of the recommendation system 164. Process 500 can be performed as a sub-process of process 400, e.g., at blocks 406 and 408 of FIG. 4.

At block 502, process 500 can retrieve user data for a planned activity, e.g., the user data retrieved at blocks 402 and 406. At block 504, process 500 can assess a history of user activity according to the obtained data to determine whether the user has a proclivity to engage in behavior that can likely lead to the filing of an insurance claim. For example, if the planned activity indicates that the user is going on a month long trip to the U.S. Virgin Islands in September during hurricane season to buy a home, then process 500 can search prior information for the user to determine, for example, whether a similar trip was made in the prior year. Using this information, process can assess the user's behavior with respect to, for instance, whether the user has a habit of visiting areas at a time of year when flooding may occur. More broadly, process 500 can use the obtained history of the user's behavior to explore whether the user has a tendency to take on active risks including, for example, knowingly visiting areas prone to flooding, driving in a snowstorm, and venturing outside when lightning is prevalent. In some implementations, process 500 can use, e.g., location data, activity logs, purchase history, a history of insurance claims, including the type of claims, any injury or damage incurred, i.e., loss, and any associated payout amount(s) to make these user risk proclivity assessments.

At block 506, process 500 can determine, using the assessment of prior user behavior at block 504, a type of user risk for the planned user activity by evaluating whether the prior behavior of the user is active or passive behavior that can lead to the filing of an insurance claim. For example, process 500 can determine whether the planned activity is the same as or similar to prior behavior of the user demonstrating a willingness to travel to locations during times for likely inclement weather. Also, process 500 can determine whether prior behavior of the user reveals the filing of an insurance claim for activity that is the same or similar to the planned activity. Still further, process 500 can determine behavior of the user according to accessible data demonstrating, by a purchase history of the user, that the user does or does not adequately prepare for inclement weather (such as buying hurricane supplies in the above example).

In some implementations, process 500 can determine the type of user risk based on a comparison of the planned activity of the user to whether other users of an insurance service filed one or more insurance claims for activity that is the same or similar as the planned activity of the user.

In view of the above, process 500 can assign the type of user risk as, for example, a low, medium, or high risk, although other scaling or gradations for the type of risk can be used. For example, the aforementioned risk types could be on a scale of 1-100, and include labels for various risk taking types (e.g., thrill seeker, risk averse, cautious driver, etc.) In some implementations, process 500 can determine and assign a given type of risk to the user in accordance with whether the user's prior behavior indicates a type of behavior known to generate one or more losses for which one or more insurance claims have been filed. Such a likelihood can be assessed with respect to prior known insurance claims covering behavior and circumstances which are the same or similar to the user's prior behavior.

At block 508, process 500 can generate a user activity profile for the planned activity of the user. In some implementations, process 500 can generate the user activity profile using each of a description of the planned activity, including its location and duration, the predicted weather for that location and duration, and/or the user risk level for the planned activity of the user. For instance, process 500 can determine semantic meaning of the user's data entry, document and/or website viewing history, etc. to generate the location and duration for the planned activity. In particular, process 500 can apply a machine learning model trained to recognize phrases, viewing patterns, etc. indicating an intent to relocate and a corresponding timeframe for the relocation. Process 500 can generate the predicted weather for the relocation destination and the applicable duration for the relocation according to a predetermined algorithm. The algorithm can produce a forecast for the relocation event in a same or similar manner as is described in relation to block 404 of FIG. 4. Alternatively or in addition, process 500 can generate the predicted weather for the user activity profile by using a forecast prepared by a weather reporting service. For instance, the forecast can be used when the timeframe for the planned activity is included in a timeframe of the forecast. Following generation of the user activity profile, process 500 can end, returning to process 400.

FIG. 6 is a flow diagram illustrating a process 600 used in some implementations for training a machine learning model, such as that discussed above in relation to block 412 of FIG. 4, to determine a needed level of insurance coverage for a user activity profile. In some implementations, process 600 can be performed, e.g., on a server system, in response to a user command to generate a model, specifying training data sources and modeling parameters.

At block 602, process 600 can retrieve historical insurance claims records providing various data. For example, the data can correspond to a multitude of users of an insurance service and demonstrate aspects including types of claims filed, locations for incidents of the claims, descriptions for user involvement in the incidents, weather at the time the incidents occurred, types and degrees of injury and/or damage, i.e., total loss amounts, maximum policy amounts, and approval or denial of the claims.

At block 604, process 600 can generate a user activity profile for each claim record. Process 600 can include in each user activity profile a plurality of the retrieved data discussed above, and particularly the type of claim filed, the duration of policy coverage, the location for an incident for which the claim was filed, a description of user involvement in the incident, and the weather at the time of the incident. Using the generated user activity profile, process 600 can pair the profile with respective claim record data reflecting the level of insurance which was actually needed to cover the claimed loss, i.e., the total loss amount.

At block 606, process 600 can convert each of the user activity profiles into machine learning model input. For example, process 600 can enter data of the user activity profiles similarly as in block 410, i.e., into a respective sparse vector that the machine learning model can receive. That is, the vector slots of the sparse vector can correspond to the particular data items of a user activity profile. For example, one vector slot can define weather conditions for a claim, and another vector slot can define time of year of a claim, etc.

At block 608, process 600 can apply the machine learning model input to a machine learning model as described in relation to block 412 of FIG. 4. In some implementations, the machine learning model can be trained with supervised learning, where the training data includes the converted user activity profiles as input, which has been paired with a desired model output (i.e., needed insurance coverage types and levels for the harm incurred).

At block 610, output from the model can be compared to the desired output for a paired insurance coverage level and, based on the comparison, the model can be modified, such as by changing weights between nodes of a neural network or parameters of the functions used at each node in the neural network (e.g., applying a loss function), updating weights between trees in a decision forest and values for leaf nodes, etc. After applying each of the pairings of the inputs and the desired outputs in the training data and modifying the model in such a manner, the model is trained to evaluate new instances of user activity profiles to generate one or more needed insurance coverage levels.

Figure 7A:
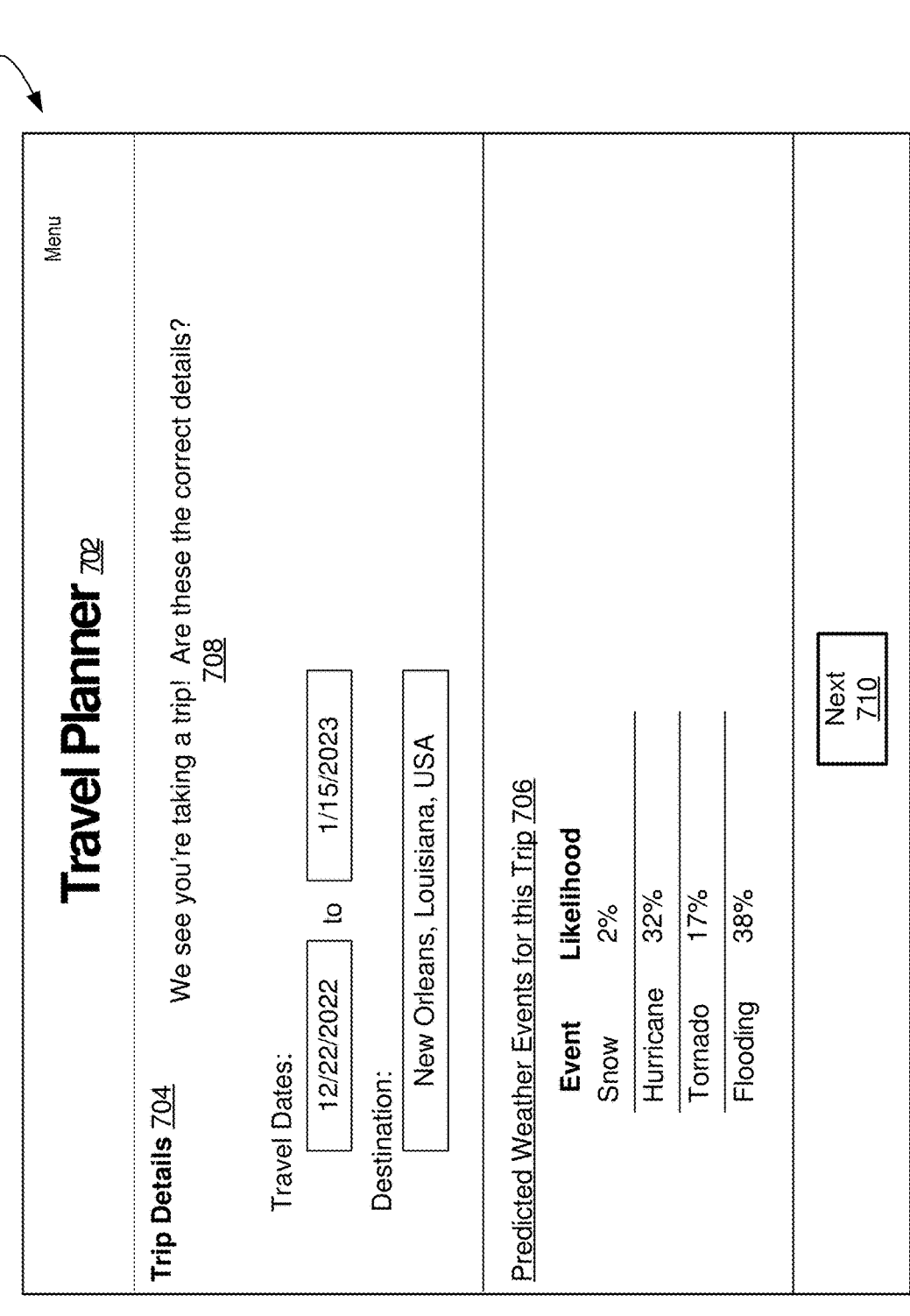
FIGS. 7A and 7B are diagrams illustrating examples of user interfaces for confirming automatically determined relocation event details and suggesting corresponding insurance products.
Figure 7B:
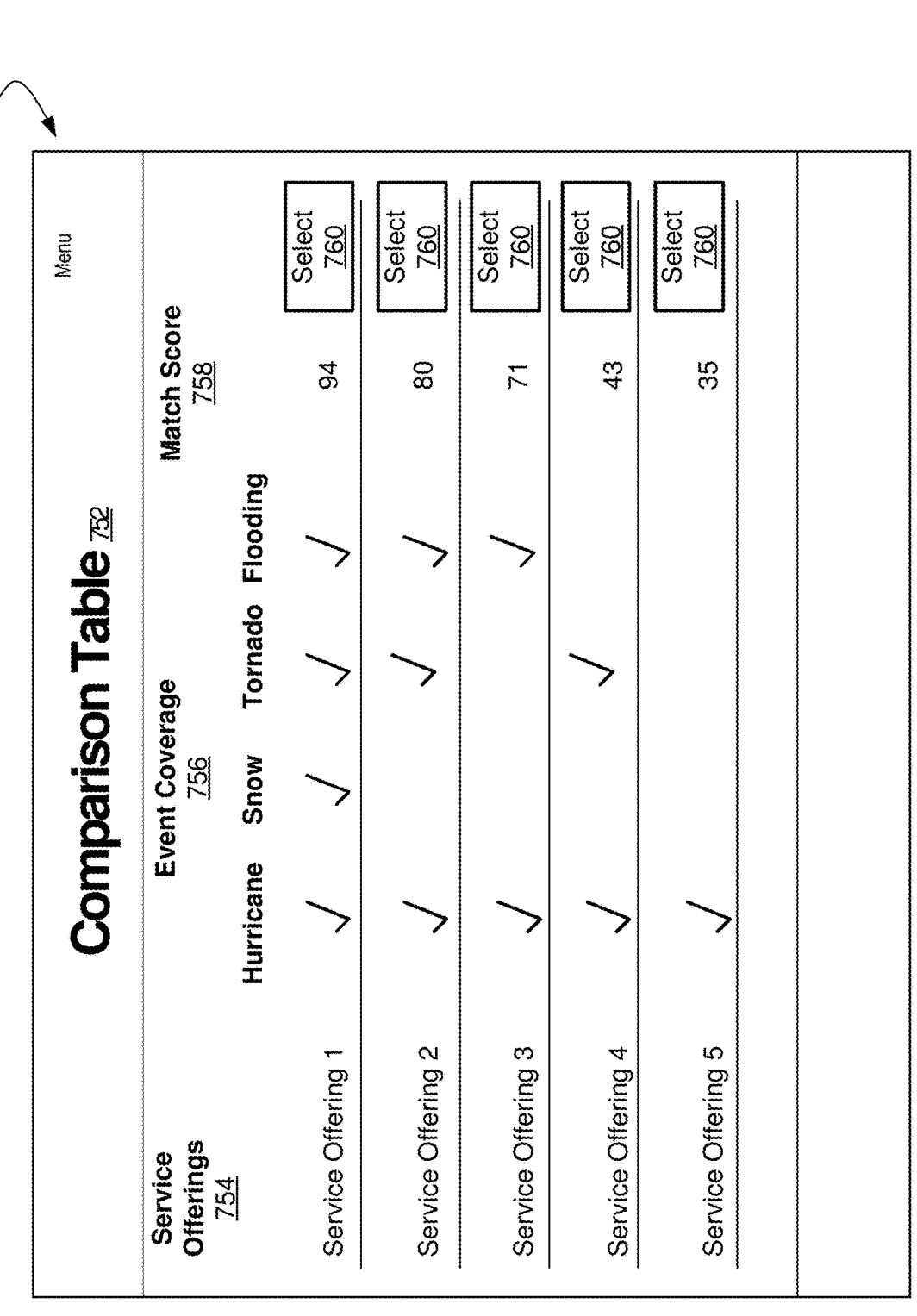

FIGS. 7A and 7B are diagrams illustrating examples 700 and 750 of user interfaces for confirming automatically determined relocation event details and suggesting corresponding insurance products.

In example 700, there is shown an instance for confirming automatically determined relocation event details of a user. Specifically, a first notification can be provided to a user according to one or more interfaces such as a mobile app, website, text message, email, etc. Therein, the first notification includes a travel planner 702 according to the user activity profile for the user which had been generated according to block 408 of FIG. 4. In particular, the travel planner 702 indicates an identified upcoming relocation of the user in the form of a trip. In this regard, process 400 of FIG. 4 has determined relevant trip details 704 (according to the retrieval of user data at block 402 of FIG. 4) which include the shown travel dates and destination of New Orleans, Louisiana. Furthermore, process 400 has determined, according to block 404 of FIG. 4, several predicted weather events 706 and the respective likelihood of each occurring at the user's destination while the user is there. As shown, the travel planner 702 queries the user at 708 whether the trip details 704 are correct. At 710, the travel planner provides the user the option to proceed if the details are correct.

In example 750, there is shown an exemplary second notification which can be provided to the user in response to the user proceeding at 710 in FIG. 7A. Such a second notification can be provided via the same or a different interface as was implemented in providing the above-discussed trip planner 702. Specifically, the second notification provides for a comparison table 752 of service offerings 754 that can be applicable to the predicted weather events 706 of FIG. 7A according to available insurance coverage 756 for those events (as shown by a checkmark). That is, the illustrated service offerings 754 can be insurance products determined by recommendation system 164 according to a match score 758 for the predicted weather events 706 as defined by the trip planner 702 of FIG. 7A. The service offerings can include coverage amounts for various damage types according to factors such as the likelihood of the events occurring, determined needed coverage levels from the machine learning model (e.g., as determined at blocks 412 and 414), the user's risk level, etc. Here, the match score 758 can indicate the degree to which a particular service offering 754 can provide one or more needed insurance coverage levels specifically tailored for that user with respect to the shown weather events. For example, if one or more of the service offerings 754 do not include one or more insurance coverage levels appropriate for at least one of the predicted weather events including a hurricane, snow, a tornado, and flooding, then the offering's match score would be reduced.

By virtue of the illustrated comparisons between shown service offerings 754, the user can, in real-time, be provided the opportunity to select, with a select control 760, a service offering. In this way, the user can be afforded the options of, for example, reviewing coverage details and purchasing the selected service offering 754. Alternatively, selection of a service offering 754 can provide the user the opportunity to adjust levels for current types of insurance coverage that the user has already purchased. Accordingly, FIGS. 7A and 7B demonstrate how recommendation system 164 can be operative to provide one or more insurance recommendations to a user in anticipation of a planned activity and one or more weather events that may occur during that planned activity.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for automatically generating insurance coverage recommendations, the method comprising:

retrieving user data evincing a user intent to relocate for a planned activity of a user;

determining, from the user data, a location and a duration for the planned activity;

determining a prediction of weather for the location and duration of the planned activity;

determining a type of user risk, indicating a level of risk taking or aversion of the user, derived from prior observed behavior of the user;

generating a user activity profile for the user comprising at least i) a first indication of the predicted weather for the planned activity, ii) a second indication of the type of user risk, and iii) a third indication of a type of the planned activity, wherein the first and second indications are each paired with a corresponding degree of severity;

converting the user activity profile into input for the machine learning model by entering, into a vector, at least i) the first indication of the predicted weather for the planned activity and ii) the second indication of the type of user risk;

wherein the machine learning model is trained, via supervised learning and in a training phase, to predict one or more needed insurance coverage levels for the planned activity, based on training data comprising A) insurance incident claims records defining training user activity profiles, each training user activity profile including at least weather data at the time of the corresponding incident paired with B) needed insurance coverage levels to cover losses for the corresponding incident, wherein the machine learning model establishes a probability distribution resulting from analysis of the training data, the probability distribution being a likelihood of an input planned activity matching a particular needed insurance coverage level, and wherein the particular needed insurance coverage level, having a highest probability according to the probability distribution, is compared to a desired output for a paired insurance coverage level and, based on the comparison, the machine learning model is modified in the training phase;

customizing the trained machine learning model and applying the customized machine learning model to the input by:

applying customizations, defined by X) the corresponding degree of severity for the first indication of the predicted weather for the planned activity, Y) the corresponding degree of severity for the second indication of the type of user risk, and Z) the third indication of the type of the planned activity, to the trained machine learning model causing the machine learning model to respond to the input specifically for similar activities, similar weather severity, and similar user risk severity; and applying the input to the customized machine learning model and, in response, obtaining the one or more needed insurance coverage levels for the user activity profile; and generating a user interface including one or more insurance coverage recommendations respectively corresponding to the one or more needed insurance coverage levels for the user activity profile.

2. The method of claim 1, wherein the user data comprises one or more of (a) a search query history, (b) a document and/or website viewing history, (c) a messaging history (d) a purchase history, or (e) any combination thereof.

3. The method of claim 1, wherein the retrieving user data for the planned activity comprises the user explicitly specifying a relocation of the user to the location for the duration.

4. The method of claim 1, wherein the determining the location and the duration for the planned activity comprises inferring the user intent to relocate by performing natural language processing on at least a portion of the user data.

5. The method of claim 1, wherein the duration is a date range; and wherein the prediction of weather for the location and duration of the planned activity is determined by (a) generating a statistical model of weather occurring at the location at a previous time matching, by year, the date range of the planned activity and/or (b) obtaining a weather prediction generated by a weather service for the location of the planned activity during the date range.

6. The method of claim 1, wherein the type of user risk is determined based on recorded prior activity of the user indicating a type of behavior known to generate one or more losses for which insurance claims are filed.

7. The method of claim 1, wherein the one or more insurance coverage recommendations are selected from a predetermined mapping of insurance coverage levels to insurance products.

8. The method of claim 1, wherein the obtained one or more needed insurance coverage levels comprise an indication of one or more types of expected damage resulting from the predicted weather with a corresponding coverage amount needed to mitigate the expected damage.

9. A computing system for automatically generating insurance coverage recommendations, the computing system comprising:

one or more processors;

one or more memories storing instructions that, when executed by the one or more processors, cause the computing system to perform a process comprising:

retrieving user data evincing a user intent for a planned relocation of a user;

determining a prediction of weather for a location and duration of the planned relocation of the user;

determining a type of user risk indicating a level of risk taking or aversion of the user, derived from prior observed behavior of the user;

generating a user activity profile for the user comprising at least i) a first indication of the predicted weather for the planned relocation, ii) a second indication of the type of user risk, and iii) a third indication of a type of the planned relocation, wherein the first and second indications are each paired with a corresponding degree of severity;

converting the user activity profile into input for the machine learning model by entering, into a vector, at least i) the first indication of the predicted weather for the planned relocation and ii) the second indication of the type of user risk, wherein the machine learning model is trained, via supervised learning and in a training phase, to predict one or more needed insurance coverage levels for the planned relocation, based on training data comprising A) insurance incident claims records defining training user activity profiles, each training user activity profile including at least weather data at the time of the corresponding incident paired with B) needed insurance coverage levels to cover losses for the corresponding incident, wherein the machine learning model establishes a probability distribution resulting from analysis of the training data, the probability distribution being a likelihood of an input planned relocation matching a particular needed insurance coverage level, and wherein the particular needed insurance coverage level, having a highest probability according to the probability distribution, is compared to a desired output for a paired insurance coverage level and, based on the comparison, the machine learning model is modified in the training phase;

customizing the trained machine learning model and applying the customized machine learning model to the input by:

applying customizations, defined by X) the corresponding degree of severity for the first indication of the predicted weather for the planned activity, Y) the corresponding degree of severity for the second indication of the type of user risk, and Z) the third indication of the type of the planned relocation, to the trained machine learning model causing the machine learning model to respond to the input specifically for similar relocations, similar weather severity, and similar user risk severity; and applying the input to the customized machine learning model;

in response to the applying, obtaining the one or more needed insurance coverage levels for the planned relocation; and generating a user interface including one or more insurance coverage recommendations respectively corresponding to the one or more needed insurance coverage levels for the planned relocation.

10. The computing system of claim 9, wherein the location and duration of the planned relocation of the user is determined by analyzing user data comprising one or more of (a) a website viewing history, (b) a messaging history (c) a purchase history, or (d) any combination thereof.

11. The computing system of claim 9, wherein the location and duration of the planned relocation of the user is determined by the user explicitly specifying the location for the duration.

12. The computing system of claim 9, wherein the duration is a date range; and wherein the prediction of weather for the location and duration of the planned relocation is determined by generating a statistical model of weather occurring at the location at a previous time matching, by year, the date range of the planned relocation.

13. The computing system of claim 9, wherein the one or more insurance coverage recommendations are selected from a predetermined mapping of insurance coverage levels to insurance products.

14. The computing system of claim 9, wherein the obtained one or more needed insurance coverage levels comprise an indication of one or more types of expected damage resulting from the predicted weather with a corresponding coverage amount needed to mitigate the expected damage.

15. A machine-readable storage medium having machine-executable instructions stored thereon that, when executed by one or more processors, cause the one or more processors to perform a method for automatically generating insurance coverage recommendations, the method comprising:

retrieving user data evincing a user intent for a planned relocation of a user;

determining a prediction of weather for a location and duration of the planned relocation of the user;

determining a type of user risk indicating a level of risk taking or aversion of the user, derived from prior observed behavior of the user;

generating a user activity profile for the user comprising at least i) a first indication of the predicted weather for the planned relocation, ii) a second indication of the type of user risk, and iii) a third indication of a type of the planned relocation, wherein the first and second indications are each paired with a corresponding degree of severity;

converting the user activity profile into input for a machine learning model by entering, into a vector, at least i) the first indication of the predicted weather for the planned relocation and ii) the second indication of the type of user risk, wherein the machine learning model is trained, via supervised learning and in a training phase, to predict one or more needed insurance coverage levels for the planned relocation, based on training data comprising A) insurance incident claims records defining training user activity profiles, each training user activity profile including at least weather data at the time of the corresponding incident paired with B) needed insurance coverage levels to cover losses for the corresponding incident, wherein the machine learning model establishes a probability distribution resulting from analysis of the training data, the probability distribution being a likelihood of an input planned relocation matching a particular needed insurance coverage level, and wherein the particular needed insurance coverage level, having a highest probability according to the probability distribution, is compared to a desired output for a paired insurance coverage level and, based on the comparison, the machine learning model is modified in the training phase;

customizing the trained machine learning model and applying the customized machine learning model to the input by:

applying customizations, defined by X) the corresponding degree of severity for the first indication of the predicted weather for the planned relocation, Y) the corresponding degree of severity for the second indication of the type of user risk, and Z) the third indication of the type of the planned relocation, to the trained machine learning model causing the machine learning model to respond to the input specifically for similar relocations, similar weather severity, and similar user risk severity; and applying the input to the customized machine learning model;

in response to the applying, obtaining the one or more needed insurance coverage levels for the planned relocation; and generating a user interface including one or more insurance coverage recommendations respectively corresponding to the one or more needed insurance coverage levels for the planned relocation.

16. The machine-readable storage medium of claim 15, wherein the location and duration of the planned relocation of the user is determined by analyzing user data comprising one or more of (a) a website viewing history, (b) a messaging history (c) a purchase history, or (d) any combination thereof.

17. The method of claim 1, wherein the machine learning model is modified, in the training phase, by changing weights between nodes of a neural network, changing parameters of functions used at each node in the neural network, or updating weights between trees in a decision forest and values for leaf nodes.

18. The method of claim 1, wherein the prediction of weather is generated based on a statistical model of weather patterns for a timeframe for the planned activity.

19. The method of claim 18, further comprising:

determining that the timeframe for the planned activity is included in a timeframe of a meteorological weather forecast;

updating, based on the determining that the timeframe for the planned activity is included in the timeframe of the meteorological weather forecast, the prediction of weather for the location and duration of the planned activity by obtaining the meteorological weather forecast for the timeframe for the planned activity;

updating the input corresponding to the user activity profile by updating the first indication of the predicted weather for the planned activity based on the obtained meteorological weather forecast;

further customizing the trained machine learning model and applying the further customized machine learning model to the updated input by:

applying further customizations, defined by an updated corresponding degree of severity for the updated first indication of the predicted weather for the planned activity, to the trained machine learning model causing the machine learning model to respond to the updated input specifically for similar weather severity; and applying the updated input to the customized machine learning model and, in response, obtaining one or more updated insurance coverage levels for the updated user activity profile; and updating the user interface by replacing the one or more insurance coverage recommendations with one or more updated insurance coverage recommendations respectively corresponding to the one or more updated insurance coverage levels for the updated user activity profile.

20. The method of claim 19, further comprising:

automatically generating one or more notifications in real-time when the one or more updated insurance coverage levels are generated; and transmitting the one or more notifications to the user via a user device in real-time.

\* \* \* \* \*